United States Patent [19]

Hill

[11] Patent Number: 4,697,371
[45] Date of Patent: Oct. 6, 1987

[54] METHOD AND APPARATUS FOR LOCATING AND CATCHING FISH

[76] Inventor: Loren G. Hill, 2826 Castlewood, Norman, Okla. 73069

[21] Appl. No.: 830,573

[22] Filed: Feb. 18, 1986

Related U.S. Application Data

[62] Division of Ser. No. 607,273, May 4, 1984, Pat. No. 4,578,889.

[51] Int. Cl.$^4$ .............................................. A01K 79/00
[52] U.S. Cl. .............................................. 43/4; 43/4.5
[58] Field of Search .................................... 43/4, 4.5

[56] References Cited

U.S. PATENT DOCUMENTS 3,031,788  5/1962  Shannon .................................. 43/4
4,103,447  8/1978  Hill ........................................ 43/4.5

Primary Examiner—Kurt Rowan
Attorney, Agent, or Firm—William R. Laney

[57] ABSTRACT

A method for locating and catching fish in which a pH measuring device is lowered from the surface of a body of water constituting a fish habitat. During the lowering of the device, the depth at which the device is located is measured periodically, and the pH of the water at the several measured depths is determined. The several measured depths and the corresponding pH values are compared to determine the rate of change of pH per unit of depth. One or more discrete intervals of depth of the water over which the greatest rates of change of pH occur are identified. Upon completion of the lowering, the pH measuring device is removed from the water. A fish catching device is lowered in the water to a point located from about one to eight feet above a depth interval at which a marked increase in the rate of change of pH in the water has been identified as occurring.

1 Claim, 12 Drawing Figures

METHOD AND APPARATUS FOR LOCATING AND CATCHING FISH

This is a divisional of co-pending application Ser. No. 607,273 filed on May 4, 1984, now U.S. Pat. No. 4,578,889.

FIELD OF THE INVENTION

This invention relates to methods for locating fish, and more particularly, but not by way of limitation, to a method and apparatus for locating game fish in a body of fresh water, and for catching the fish so located.

BRIEF DESCRIPTION OF THE PRIOR ART

In my U.S. Pat. Nos. 4,103,447 and 4,349,976, I have described certain methods and apparatus for locating and catching fish. These methods and apparatus are based generally on my discovery that pH is an important parameter in the metabolism requirements of certain species of fish, and that fish of these species preferentially locate in water which is generally within a certain pH range. Apparatus is described in the patents for locating the fish in accordance with the sensed pH values of the water and correlation thereof with the predetermined optimum pH range, then catching the fish by the use of a boat having the pH sensing and measuring instrumentation located thereon.

BRIEF DESCRIPTION OF THE PRESENT INVENTION

I have now surprisingly determined that fish locate adjacent a vertical water profile (i.e., the water from the surface essentially vertically to the bottom of a lake or other body of water constituting a fish habitat) at a depth along the vertical profile which extends from the depth in the water at which the rate of change of pH per unit of depth undergoes a marked and detectable increase up to about eight feet above that depth. This increase of the rate of change of pH is with respect to the rate of change of pH at locations above and below the high rate of change depth interval. Stated differently, I have determined that there exists, without known exception, a "pH breakline" located in an impounded body of water at approximately a single identifiable depth. The pH breakline is characterized by a relatively rapid increase or decrease in the pH value of the water with increasing depth, as compared to the rate of change of pH at other depths of the water from the surface to the bottom of the lake or other body of water. In some instances, two or even three pH breaklines may be detected between the surface and the bottom of a relatively deep lake or body of water, and in each case, the greatest concentrations of fish have been found to locate in a zone which is from about one to eight feet above these breaklines.

Intrestingly, the phenomena of fish preferentially locating at a depth which lies immediately at or above the breakline where the pH changes rapidly appears to be independent of the temperature of the water. It also appears to be independent of characteristics of structure within, and topographical locations of, various fresh water lakes which have been tested in identifying the pH breakline and confirming its repeatability. Its existence is also substantially independent of the particular type of day upon which the breakline is identified and the fish location depth is determined. The depth at which a pH breakline occurs will, within a given lake and at a given location (vertical water profile) on the lake, vary in the depth of its location from season to season, and under different climatic and weather conditions. This is because, as explained in my above cited patents, pH is dependent upon a number of conditions which include, inter alia, the amount of sunlight impinging upon the water, the amount of green plants located at the edge of the water and the amount of water plant growth in the water, as well as the types of tributary streams, the amount of fresh water carried into the lake by such tributaries, and the salt content of the tributaries following certain changing weather conditions. However, despite the shifting in a vertical direction (either up or down) of the breakline representing the greatest rate of change of pH with changing depth, the existence of such a breakline and the phenomena of the fish locating in greatest concentrations in a narrow band or strata immediately above the breakline continue to hold true. This further demonstrates the independence of the response of the fish to this phenomena from any significant influence by other external factors, such as pressure, overcast or sunny days, temperature or salinity (except insofar as the latter are factors which themselves are frequently of major importance in determining the particular pH value observed).

It has also been my observation that the pH may be changing by undergoing a rapid increase in value with increasing depth, or it may be undergoing a rapid decrease in value with increasing depth. In either case, the phenomena of the location of the greatest concentration of fish in reference to the breakline continues to occur, and to identify the optimum place in the water, in terms of a depth location, at which to place the lure or other fish catching device in order to enjoy the greatest success.

So important have I found the influence of the pH breakline to be upon the location of fish in a fresh water body, that occasionally it is possible even to find a fairly numerous quantity of fish located immediately above the pH breakline in water which is slightly outside the optimum range of pH which I have previously identified in my prior patents as that at which fish will preferably locate. This is to say that even though another location in the same body of water constituting a fish habitat may contain water which is within the identified optimum range of pH, as identified in my U.S. Pat. No. 4,103,447, some fish still will sometimes congregate adjacent a pH breakline lying outside this zone of water having a pH within this optimum range. Some few fish in the body of water will often do so, even though greater quantities of fish will be found adjacent a pH breakline located in that zone of the body of water which falls within the optimum pH range. Stated differently, though a fisherman may not have the time or the fuel to take numerous pH measurements in the lake to optimize the general pH value of the water in which he will fish, he can expect to often be successful in locating fish immediately above a pH breakline, once it is identified, even though the average value of the pH at that location in the lake is slightly outside the optimum range at which, in general, the fish preferentially locate.

In terms of the traditional expression of the entire range of the pH parameter as extending from 1 to 14, I have found that in almost all instances of identified pH breaklines, the value of the pH at the breakline is found to change (either increase or decrease) at a rate of from about 0.2 to 0.5 units of pH over a two foot change in depth. Fish are then found to congregate from the breakline depth up to eight feet (and usually, from one to four feet) above the depth at which this high rate of change of pH (in pH/foot) is found to occur.

The apparatus employed in practicing the fish locating and catching method of the invention comprises a pH sensing device which can be lowered vertically in the water, a boat from which the pH sensing device can be lowered, a readout device carried in or on the boat which can sensibly (visually or audibly) communicate to a fisherman, the fact of the occurrence of the pH sensing device traversing a zone or interval of water over which the rate of change of pH is greatest, and means for measuring the depth within the water at which the pH sensing device is located when the readout device indicates that the greatest rate of change of pH with unit of depth is occuring. The apparatus for practicing the method of the invention will further include means mounted on the boat for supporting and lowering a fish catching device to a depth in the water which is immediately above the pH breakline, said device being used in association with means for indicating the depth of the fish catching device at any time.

Another embodiment of the apparatus of the invention entails the utilization of a shielded pH sensing device which also functions by the use of camouflaging and adequate shielding as a lure or bait having the associated hooks necessary to catch fish. Where this form of apparatus is employed, once the pH breakline has been identified, the combination pH sensing device and fish catching apparatus, including the lure and necessary hooks, can be retrieved to a depth just above the depth at which the breakline has been found to occur. There is thus eliminated the need for a separated tackle subassembly, rod or pole mounted on the boat, and operating and used independently of the pH sensing device.

While I do not profess to be able to advance any proven scientific explanation for the important influence which the pH breakline has been found to exert upon the location of fish along the vertical profile from top to bottom of the body of water, I deem it a rational partial explanation that fresh water lakes, in general, develop a stratification marked by a narrow, horizontal interface, with certain chemical conditions upon which pH is dependent being different on opposite sides of this horizontal interface. Whatever may be the difference in the chemical character of the water on opposite sides of this horizontal interface or zone of stratification, the pH breakline has been found to be a repeatable phenomena.

GENERAL DESCRIPTION OF THE DRAWINGS

DETAILED DESCRIPTION OF A PREFERRED EMBODIMENT OF THE INVENTION

Figure 1:
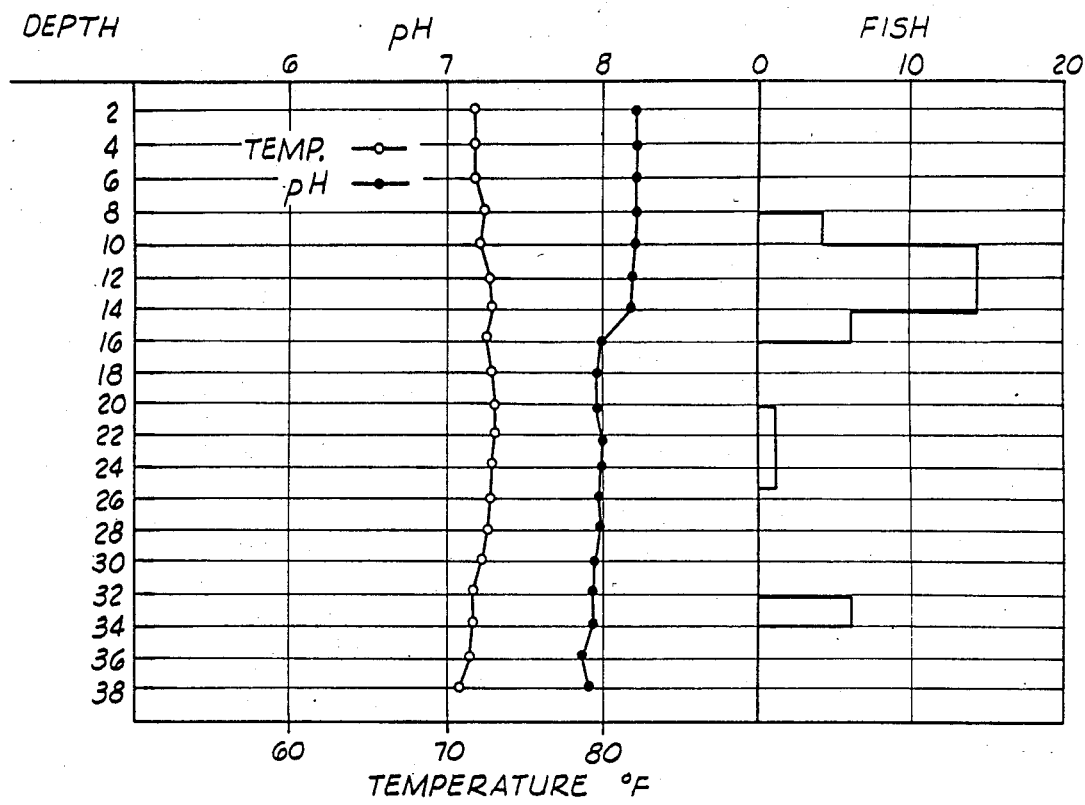
FIG. 1 is a graphic plot of temperature and pH against water depth showing the existence of a pH breakline located in Lake Texoma in southern Oklahoma on Oct. 12, 1983. The number of fish determined to be located at various depths on the same occasion is also plotted, as such numbers were discovered utilizing a Fish Finder sonar system.
Figure 2:
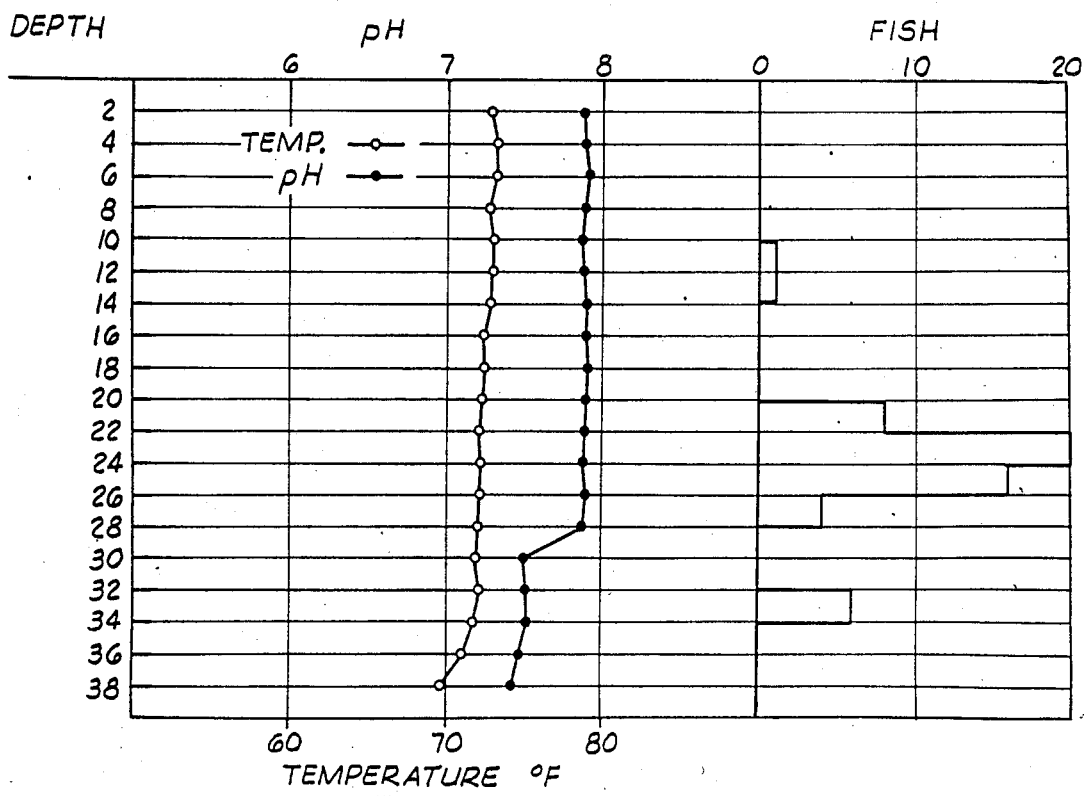
FIG. 2 is a another plot of temperature and pH against depth taken on the same date, Oct. 12, 1983 at a different location on Lake Texoma, Okla., and based upon measurements taken at a different location in the lake. The fish populations at various depths is also shown on this plot as determined by an electronic sonar instrument.

Referring initially to FIG. 1 of the drawings, illustrated there are the values which I measured along a vertical water profile in Lake Texoma, Okla., a large impoundment on the Red River, on Oct. 12, 1983 at approximately 2:00 p.m. Values for the water temperature and the pH were measured at two foot intervals from the surface to a depth of thirty-eight feet. It will be perceived that in referring to the FIG. 1 graph that on this fall day the water temperature was fairly constant from the surface (about 72°) to a depth of thirty-eight feet (approximately 70°). The measured pH values commenced at a value of about 8.2 at a depth of two feet, and stayed relatively constant at this pH until a depth of fourteen feet was reached. Between a depth of fourteen feet and sixteen feet, the pH decreased by 0.2 to a value of 8.0. From the depth of sixteen feet to thirty feet, the pH remained very close to 8.0. Over the next eight feet, however, the pH decreased slowly to a value of about 7.9. From this, it will be noted that between a depth of fourteen feet and a depth of sixteen feet, the pH changed at a rate of about 0.2 over the two foot interval at which this measurement and the succeeding measurement at sixteen feet were taken. It will further be seen from the plot of these pH values against depth that the greatest rate of change of pH occurred between fourteen and sixteen feet where the change amounted to a rate of change of about 0.1 per foot.

Using a Lowrance X-15 depth and fish finder, the location of fish populations to be found from the surface downwardly along the vertical water profile upon which the pH and temperature measurements were taken showed that the greatest population of fish occurred between ten and fourteen feet. Lesser amounts of fish occurred between fourteen and sixteen feet and between eight and ten feet. Three fish were found located at staggered vertical levels between twenty feet and twenty-five feet in the water. About six fish were found to located at a depth of between thirty-two and thirty-four feet.

From these measurements it will be apparent that the greatest fish population along the vertical water profile under study occurred immediately above the pH breakline which, as explained above, was identified as occuring between fourteen and sixteen feet downwardly in the lake. In other words, the pH breakline was between fourteen and sixteen feet in depth, and the greatest fish population along the vertical water profile was ascertained to be located between ten and fourteen feet in depth. This preferred location of fish was further confirmed by the rapidity and success with which bass fish were actually caught over the depth range where a maximum fish population was identified as occurring, as opposed to depths above and below this location.

At another location on Lake Texoma, Okla., also on Oct. 12, 1983, but located at a distance of about four miles from where the first measurements depicted in FIG. 1 were taken, further experiments were carried out to determine the existence of a pH breakline, and the relationship of fish population along the vertical water profile to that pH breakline. As FIG. 1 shows, the temperature at this particular location in the lake, as measured from a depth of about two feet down to about thirty-eight feet, gradually declined from a value of about 73° at the two foot depth to a value of about 69° at the thirty-eight foot depth.

Measurement of the pH of the water at two foot depth intervals showed that the pH remained nearly constant at a value of 7.9 from two feet deep in the lake to a depth of twenty-eight feet. At this point, there was a sudden break in the pH with the pH undergoing a decrease in value between twenty-eight and thirty feet. Here the pH decreased from 7.9 to 7.5. Then, from a depth of thirty feet on down to a depth of thirty-eight feet in the lake, as measured along the vertical water profile under study, the pH decreased only slightly from 7.5 to 7.4. Thus, the measurements made indicated the existence of a pH breakline between twenty-eight and thirty feet deep in the lake, and further indicated the apparent independence of water pH from the temperature value of the water at varying depths. (The pH at the breakline changed at the rate of 0.2 per foot of depth.)

Use of the Lowrance X-15 fish finder sonar instrument for identifying fish populations along the vertical water profile showed that the greatest number of fish were located between twenty-two feet and twenty-four feet in the lake, with slightly smaller populations found between twenty-four and twenty-six feet, and between twenty and twenty-two feet. Still smaller populations of fish were located above and below the large grouping of fish just above the pH breakline. Thus, the graph shows one or possibly two fish located between ten feet and fourteen feet, and about six fish located between thirty-two and thirty-four feet.

Figure 3:
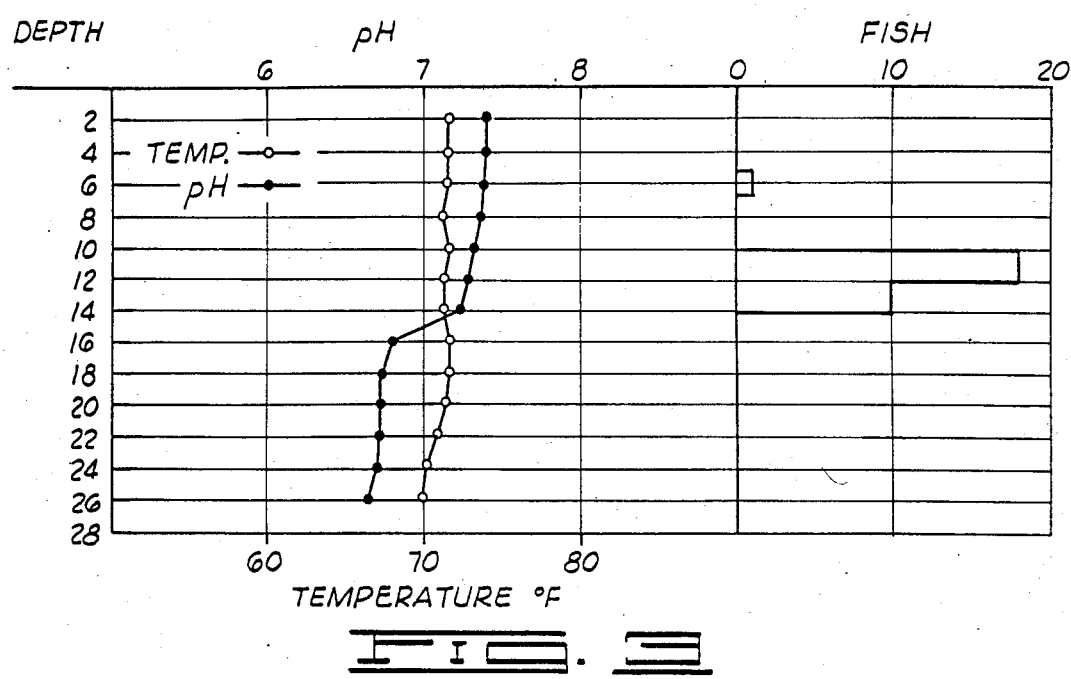
FIG. 3 is a similar plot of temperature and pH values against water depth based on values observed at different depths in Barry Lake in Florida on Apr. 16, 1983. The fish populations at various depths along the vertical profile upon which the various pH and temperature values were taken are also shown on this graph.
Figure 4:
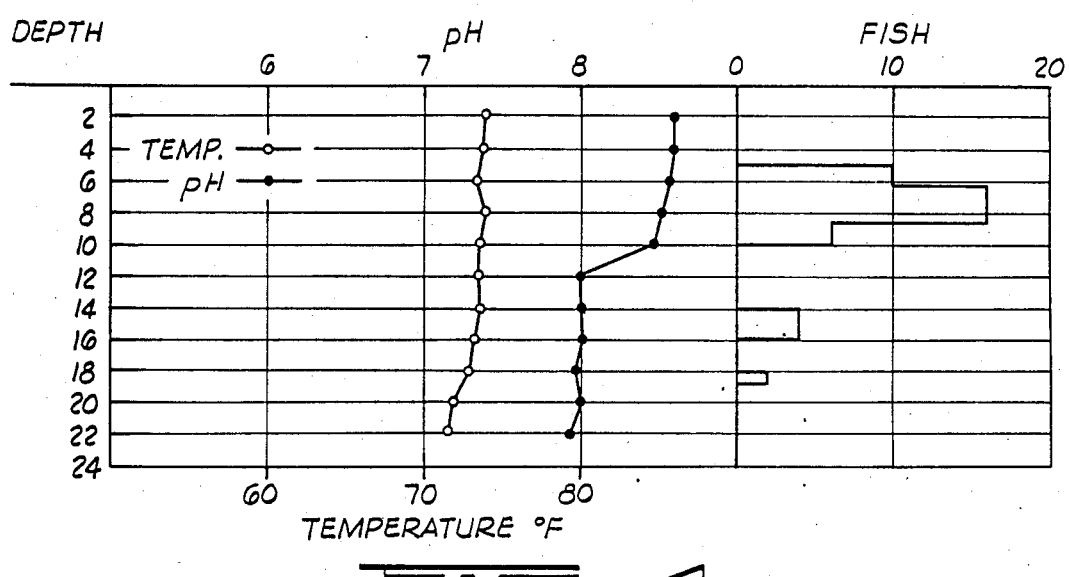
FIG. 4 is a graphic plot of the pH and temperature values of the water also taken on Apr. 16, 1983 on Barry Lake in Florida based on measurements taken along a different vertical water profile located in another part of the lake. The fish populations identified as present at different depths in the lake is shown to the right on the same graph.

FIG. 3 of the drawings is a graph of the temperature and pH measurements taken to develop the location of the pH breakline in Lake Barry, Fla. at 10:30 a.m. on Apr. 16, 1983. The temperature of the water at this time was substantially constant, varying from a temperature of about 72° at a depth of two feet to a temperature of 70° at a depth of twenty-six feet. The pH breakline occured between a depth of fourteen and sixteen feet, where the pH fell from a value of 7.2 to 6.8. Thus, this greatest rate of change of pH, as compared to that observed over the remainder of the entire vertical water profile, was a rate of 0.2 per foot.

Use of a fish finder instrument located the maximum fish population density along the vertical water profile at a depth of between ten and twelve feet, with fewer fish immediately below this at the twelve to fourteen foot depth zone. Thus, the fish were again found to congregate preferentially at a depth extending upwardly from the pH breakline for a distance of about four feet. The greatest number of fish was found between two and four feet above the commencement of the pH breakline.

A second set of measurements were made on Lake Barry, Fla. also on Apr. 16, 1983, at 2:00 p.m., at a location a considerable distance from the first measurements made in the same lake and depicted in FIG. 3. Here the water temperature decreased slightly from the surface downwardly to a depth of twenty-two feet, dropping from 74° at the surface to slightly less than 72° at the twenty-two foot depth. The pH of water at this location fell slowly from a pH of 8.6 two feet below the surface to a pH of slightly less than 8.5 at ten feet. At this point, the pH breakline occured, with the pH changing from 8.5 at a depth of ten feet in the lake to a pH of 8.0 at a depth of twelve feet in the lake. From twelve feet downwardly to twenty-two feet, the pH then only underwent a slight decrease, dropping from 8.0 to a little more than 7.9.

With the location of the pH breakline thus established, the fish finder was used to locate the largest population of fish along the profile. This was found to occur at between six and eight feet, again about two feet above the beginning of the pH breakline. There were, however, lesser quantities of fish located between eight and ten feet of water depth and between five and six feet of depth in the water. The location of fish at these depths was subsquently confirmed by actually catching significant quantities of fish by fishing at a depth of about eight to ten feet in the water. More success was had when fishing at this depth than when fishing at shallower or deeper depths along the vertical water profile.

Figure 5:
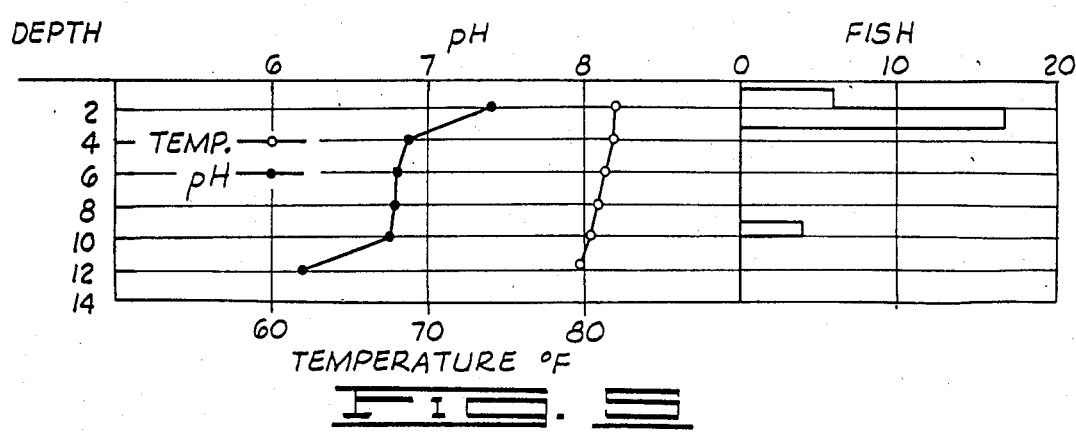
FIG. 5 is a graphic plot of the temperature and pH values measured at different depths of the water in Lake Carter, Okla. on Sept. 8, 1983 along a vertical water profile. The fish population present at different depths is also depicted on the graph.
Figure 6:
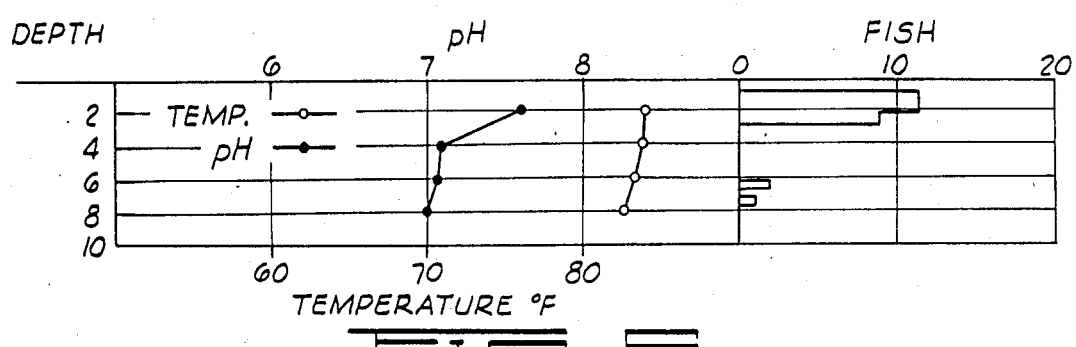
FIG. 6 is another plot of a vertical water profile, in terms of the pH and temperatures measured for the water at two foot depth intervals, and protraying the fish populations determined to exist at different depths in the lake. The plotted data seen here were also obtained on Lake Carter in southern Oklahoma.

On Sep. 8, 1983, the pH and water temperature values at two foot depth intervals were taken along two different vertical water profiles in Lake Carter in Marshall County, Okla. These two profiles are depicted in FIGS. 5 and 6. In the FIG. 5 plot, which graphically protrays data obtained at 3:30 p.m., the temperature, as measured downwardly from a two foot depth to a depth of twelve in this relatively shallow lake, shows that the water temperature decreased at a relatively uniform rate from a temperature of about 82° at a depth of two feet to a temperature of 80° at a depth of twelve feet.

The pH measurements established the existence of a shallow occurring pH breakline between two and four feet deep in the lake, and a second, deeper pH breakline occurring at a depth of between ten and twelve feet in the lake. In each case, the rate of change of pH was about 0.25 per foot. On this occasion, the greatest population of fish was found very close to the water surface, i.e. between one foot and three feet. A smaller group of fish was found to be located just above the lower of the two pH breakline at a depth of between nine and ten feet in the lake.

The second group of measurement taken along the second vertical water profile in Lake Carter is depicted in FIG. 6. Again, the pH breakline is seen to occur between two and four feet of depth, and the greatest population of fish along the vertical water profile is found between one and three feet.

Figure 7:
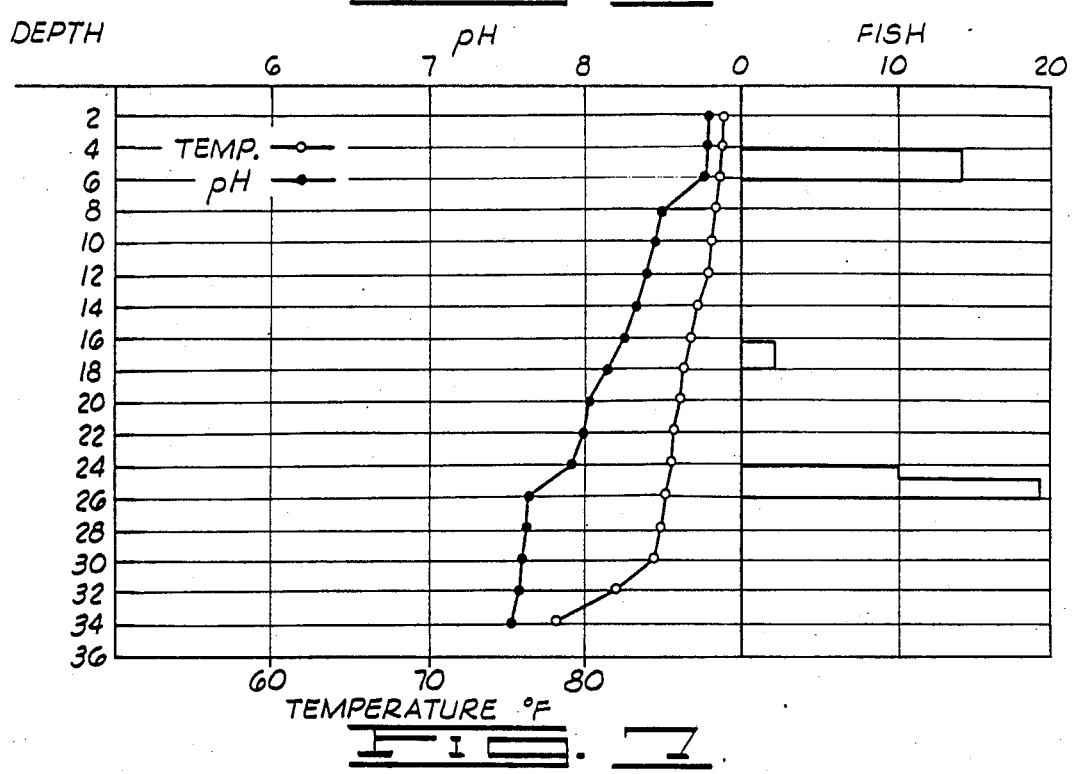
FIG. 7 is another graph depicting the pH and the temperature values ascertained to exist at different depths along a vertical water profile in Lake Texoma, Okla. on July 10, 1983, and also depicting the fish populations found to be located at various depths from which the pH and temperature values were taken.
Figure 8:
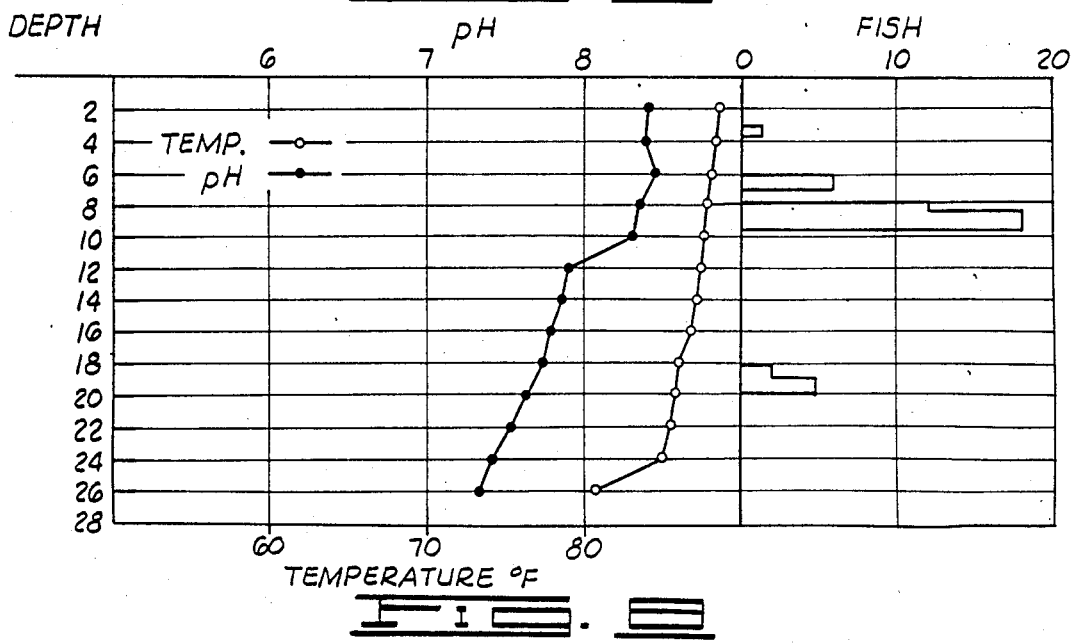
FIG. 8 is another plot in which the pH and temperature values of the water at different depths are protrayed, as such were measured along a vertical water profile in Lake Texoma, Okla. on June 26, 1983. The populations of fish at different depths is also shown.

Other measurements taken on two summer days on Lake Texoma, Okla. are graphically protrayed in FIGS. 7 and 8. In the measurements taken on July 10, 1983, as depicted in FIG. 7, it will be noted that the water temperature was determined to be about 89° adjacent the surface, and decreased slowly at a relatively uniform rate to a depth of thirty feet. At this point, the water temperature then decreased more rapidly to a value of about 77° F. at a depth of about thirty-four feet. The pH was measured at 8.7 at a depth of two feet. It decreased slowly to a depth of six feet, and then a pH breakline was observed between six and eight feet in depth, where the pH dropped from about 8.7 to about 8.4.

As the pH at increasing depth was measured, a second pH breakline was located between twenty-four and twenty-six feet in depth in the lake where the pH dropped from 7.9 to 7.6. Thus, in the case of each of these pH breaklines, the rate of change of pH was about 0.15 per foot. The largest concentrations of fish along the vertical water profile were found between four feet and six feet and between twenty-four feet and twenty-six feet, again confirming the correlation of preferential fish location along the vertical water profile to the location of pH breaklines.

FIG. 8 shows another plot of pH and temperature data accumulated on the same lake (Lake Texoma) approximately two weeks earlier on June 26, 1983. The plot of temperature on that occasion resembled that taken on July 10. The pH profile on June 26 was, however, detected between ten and twelve feet where the pH dropped from 8.3 to 7.9 over a two foot depth interval. Again, the heaviest concentration of fish was found at a depth from about one to two feet above the pH breakline.

The illustrated graphic plots of temperature and pH against depth clearly show that a pronounced pH breakline was discerned in all of the reported measurements made along vertical water profiles in the several lakes discussed. This data, as well as other observations, of which the depicted data is representative, confirm that a general characteristic of the pH breakline is a rate of change of pH of at least 0.15 per foot of depth of water. Even more generally, however, it can be stated that a pH breakline appears to always be present in an impounded body of fresh water (one where there is no significant current or other prevailing and substantially continuous movement of currents, eddies or the like), and that the pH breakline is characterized by a more rapid change in pH than is observed in the water above and below the breakline. The latter characteristic must be understood, however, as accommodating the possible presence of two, and occasionally even three, vertically spaced breaklines in deeper lakes.

The data further show that fish preferentially concentrate in the section or zone of water which extends from the pH breakline upwardly in the water for a distance of from about two to about eight feet, and can be caught more successfully by fishing at this location than at a different location.

I will not presume to make a definite rationalization and explanation of the pH breakline phenomena. It is known, however, that water changes density with depth and becomes more dense as the depth increases. It is also known that there is usually less circulation of the water at greater depths. Thus, there may tend to be, in many instances, a more acidic character to the water at a greater depth due to the natural decay of organic material on the bottom. Further, light penetration from the surface decreases as depth increases and the amount of photosynthesis occuring at greater depths therefore also decreases. This also results in the development of a lower pH at greater depths. Finally, as I have already observed, there is known to be a stratification occurrent in fresh water lakes which changes seasonally as lakes "turn over". All of these factors, as well as others, undoubtedly play a role in the development of a constant or slowly changing pH extending down into the water to the location where the pH breakline is observed to occur.

The preference of fish for the zone of water which extends upwardly for a few feet from the breakline is not limited to a particular species. I have determined that the same behavior is observed on the part of Chinook Salmon caught in Lake Michigan at a depth of fifty-five feet where a breakline was detected. It is also effective with Large Mouth Bass and Striped Bass.

Figure 9:
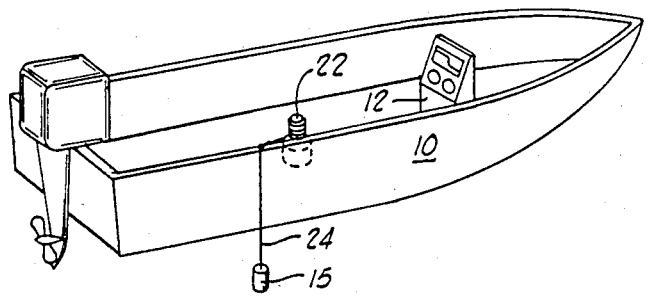
FIG. 9 shows a fishing boat for practicing the method of the invention.

Apparatus for practicing the fish locating and catching methods of the invention is illustrated in FIGS. 9-12. In FIG. 9 of the drawings, a fishing boat 10 is illustrated. Mounted within the boat is a pedestal 12 supporting certain instrumentation, including a readout device in the form of a pointer-indicator scale 14 upon which the pH of the water beneath the boat is continously indicated as it is sensed by a pH sensing device 15 lowered in the water from the boat.

The instrumentation also includes a CRT display 16 or strip chart recorder upon which there is graphically displayed, pH values sensed at various depths as the sensing device is lowered in the water. This particular display, which is also visible to the fisherman, will show a pronounced inflection point in the curve or plot of pH against depth at the depth in the water where a pH breakline occurs.

Figure 10:
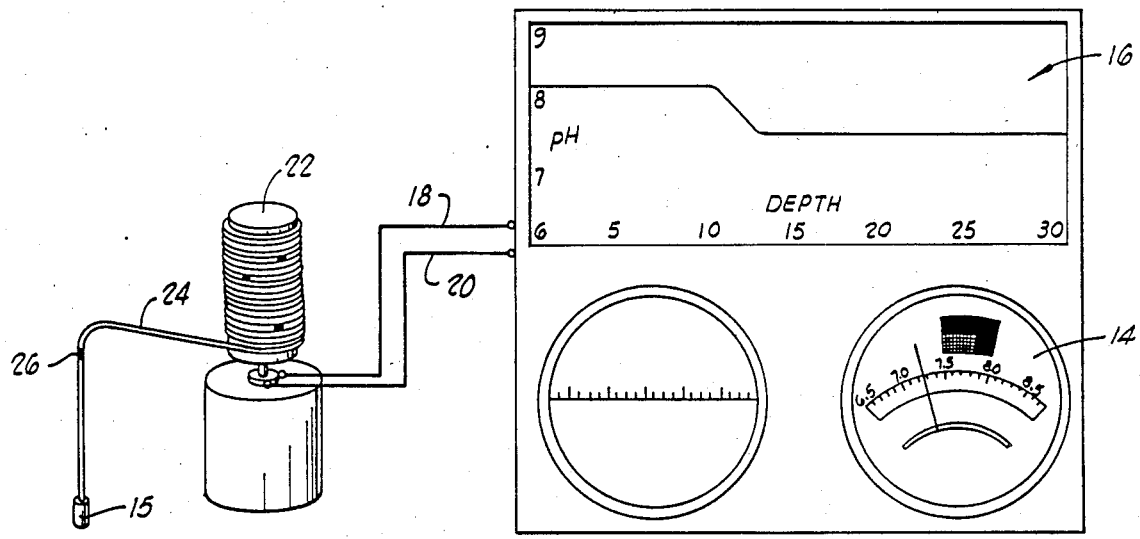
FIG. 10 shows instrumentation for measuring pH.

As shown in FIG. 10, a pair of signal input leads 18 and 20 extend from the instrumentation to a suitable rotatable reel 22, drum or the like which has reeled thereupon, an elongated flexible element 24 used to support and lower the pH sensing device 15 into the water alongside the boat. The elongated flexible element 24 may be in the form of a cable or lead harness which includes a signal carrying lead (not shown) for transmitting signals representative of the sensed pH to the signal lead 18 via the reel 22, and a sensing device supporting cable (not shown) which functions to provide physical support for the pH sensing device 15 in the water.

The elongated flexible element 24 constituting the harness carries, at spaced intervals therealong, appropriate color coded markers 26 which serve to visually indicate to the fisherman, the depth in the water to which the pH sensing device has been lowered. It will be understood, of course, that as the reel rotates to unwind and lower the elongated flexible element 24 into the water, suitable electronic circuitry is provided which is energized to develop a signal which is correlated to the depth to which the sensing device has been lowered, and to input this signal to the signal lead 20 for transmission to the pointer-indicator scale 14 and the CRT display 16.

Figure 11:
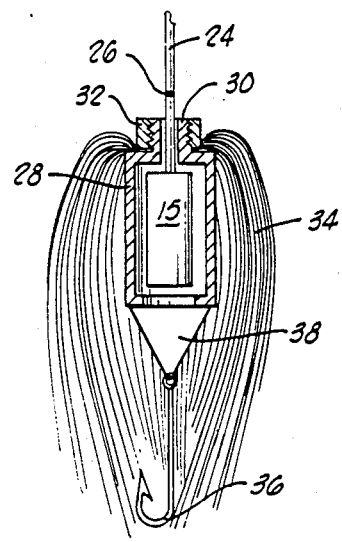
FIGS. 11 and 12 show integrated tackle-pH sensing devices.
Figure 12:
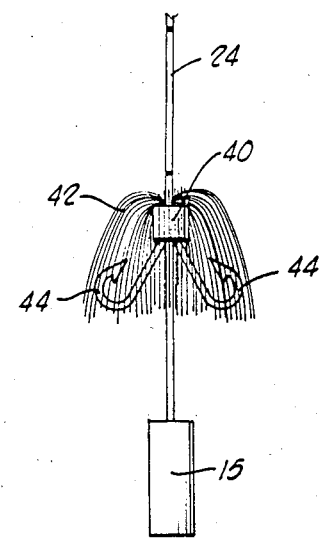

FIGS. 11 and 12 of the drawings show two forms of integrated tackle-pH sensing device systems which can be beneficially used as part of the apparatus of the present invention. In FIG. 11, the lower end of the elongated flexible element 24 is shown connected to the pH sensing device 15. In this embodiment of the invention, the pH sensing device 15 is shielded or protected by a suitable water permeable rigid shield housing 28 which extends around and protects the pH sensing device 15 from damaging contact with external objects. The shield 28 also protects the sensing device from a strike by a fish as will be better understood from the ensuing description of the remainder of the apparatus.

The shield housing 28 carries a threaded neck 30 at the upper end onto which is threaded a collar 32 which functions to retain a bucktail ring having flexible filaments or fibers hanging down thereform to form a bucktail skirt 34. The bucktail skirt 34 completely surrounds the shield housing 28 and also is of sufficient length to also camouflage a hook 36 which is swively mounted by suitable connecting element 38 to the lower side of the shield housing 28.

When using the integrated pH sensing device—tackle system depicted in FIG. 11 as a part of the apparatus of the invention, a pH sensing device may be lowered in the usual manner to sense the value of the pH of the water at increasing depths. The lowering is continued until the pH breakline is located. At this depth, the fisherman may choose to simply allow the integrated pH sensing device-tackle system to remain in place, since the system is devised to present an attraction to fish, and to catch fish which strike at the lure constituted by the bucktail skirt 34.

It should be pointed out that in lieu of the bucktail skirt 34, other types of devices attaractive to fish may be utilized. In fact, it is within the scope of the present invention to make the shield housing 28 in the form of an artificial minnow or other hard baits attractive to fish.

A different embodiment of the integrated pH sensing device-tackle system is illustrated in FIG. 12. Since, as previously indicated herein, the largest fish population will be found to exist at a depth which is several feet above the location of the pH breakline, an arrangement in which the bucktail, hooks and other trackle paraphernalia are spaced upwardly on the elongated flexible element 24 from the pH sensing device 15 is sometimes desirable. In this event, the arrangement shown in FIG. 12 may be utilized in order to most effectively catch those fish which are located in a zone which is displaced upwardly by from two to eight feet above the pH breakline. Here, a collar 40 is illustrated as in use to retain the bucktail skirt 42 at a selected location on the flexible element 24. Preferably the collar 40 is one which frictionally engages the elongated flexible element 24, thereby permitting it to be manually shifted up or down along the flexible element to adjust its position in relation to the pH sensing device 15. As previously described, the bucktail skirt 42 camouflages the hooks 44.

From the foregoing description of preferred embodiments of the methods and apparatus of the invention, it will be perceived that the invention provides clear directions to a fisherman in the use of pH values to more effectively locate and catch fish. The precise steps described, and the embodiments of the apparatus illustrated are illustrative only, since some variations can be made in these steps and in these embodiments without departure from the basic principles of the invention. Such basic principles have been set forth in the appended claims, and such claims are intended to have a range of equivalents which contemplates and encompasses, permissible variations in the apparatus and methods illustrated and described herein, so long as these variations and departures continue to rely on the basic principles of the invention.

What is claimed is:

1. Apparatus for catching fish comprising:

a boat;

a pH sensing device for sensing the pH of the water;

an elongated flexible element having a lower end and a lower end portion positioned above the lower end, said flexible element having the pH sensing device secured to said lower end thereof for lowering the pH sensing device into the water from the boat;

a readout means on the boat connected to the pH sensing device, and located on the boat for indicating to a fisherman in the boat, the depth to which the pH sensing device has been lowered, and the water pH the device senses at that depth;

tackle carried on the boat for lowering a fish catching lure in the water, said tackle including means for positioning the lure in a position which is at, or within 8 feet above, that zone in the water where the pH is shown by the pH sensing device to undergo a change in pH at a relatively great rate as compared to the rate of change of pH above or below that zone in the water;

shielding means protectively surrounding said pH sensing device;

hook means adjustably connected to said lower end portion of said elongated flexible element and located above said pH sensing device, said hook means being adjustable upwardly along the length of said elongated flexible element for selective positioning along the lower portion thereof relative to said sensing device at a location between said sensing device and the boat; and means for camouflaging said hook means.

* * * * *